United States Patent [19]

Pall

[11] 3,933,557

[45] Jan. 20, 1976

[54] CONTINUOUS PRODUCTION OF NONWOVEN WEBS FROM THERMOPLASTIC FIBERS AND PRODUCTS

[75] Inventor: David B. Pall, Roslyn Estates, N.Y.

[73] Assignee: Pall Corporation, Glen Cove, N.Y.

[22] Filed: Aug. 31, 1973

[21] Appl. No.: 393,688

[52] U.S. Cl. .............. 156/167; 156/174; 156/180; 156/181; 156/173; 264/DIG. 75; 428/288; 428/296
[51] Int. Cl.² ....................................... D04H 3/16
[58] Field of Search .......... 156/174, 173, 167, 180, 156/181; 161/170, 150, 169; 264/DIG. 75; 138/118, 129, 177

[56] References Cited
UNITED STATES PATENTS

| 3,304,220 | 2/1967 | McIntyre | 156/174 |
| 3,506,420 | 4/1970 | Jackson | 156/167 |
| 3,526,557 | 9/1970 | Taylor | 156/167 |
| 3,615,995 | 10/1971 | Buntin | 156/167 |
| 3,649,402 | 3/1972 | Schwencke | 156/175 |
| 3,689,342 | 9/1972 | Vogt | 156/167 |
| 3,801,400 | 4/1974 | Vogt | 161/166 |

Primary Examiner—William J. Van Balen
Assistant Examiner—Ellis P. Robinson

[57] ABSTRACT

A process is provided for the continuous production of nonwoven webs in cylindrical or sheet form from thermoplastic fibers, spinning the fibers continuously from a melt onto a rotating mandrel and winding them up on the mandrel to form a generally spirally wound cylinder. Density of the wound cylinder is controlled by controlling the distance between the rotating mandrel and the orifices of the spinning die through which the molten polymeric material is spun. If the spinning of the fibers is continuous, the cylinder can be formed in a continuous length. Control of the spinning rate in relation to the diameter and rate of rotation of the mandrel and the rate of advance of the cylinder on the mandrel controls the thickness of the cylinder. The cylinder can be drawn off the mandrel and used as a cylinder, or either slit lengthwise and opened out, or collapsed onto itself, for use as a sheet. The process is particularly adapted for forming filter elements.

18 Claims, 14 Drawing Figures

CONTINUOUS PRODUCTION OF NONWOVEN WEBS FROM THERMOPLASTIC FIBERS AND PRODUCTS

Cylindrical filter elements are normally formed of sheet material that is folded over onto itself into a cylindrical configuration, with the lapped edges brought together and sealed in a side seam seal. The sheet can be folded with corrugations to increase the useful area of the filter sheet within a confined space. In forming the seam, usually the two outside surfaces of the ends of the sheet are brought together. One or both of the opposed surfaces is coated with adhesive, and the seal is then formed by application of heat to set the adhesive. A seam is formed in which a layer of adhesive extends from end to end of the seam, and across the seam from the outer surface to the inner surface, and this layer of adhesive is presented endwise to the surface of the filter element. The portion of the filter element bonded to an adhesive layer in the seam is of course not porous, and this reduces the available surface area of the filter.

Various types of sealing techniques and folding of the side edges of the filter sheets at the seal have been proposed, to avoid these problems, but none have been fully successful. Canadian Pat. No. 742,053 issued Sept. 6, 1966 to David B. Pall and Herbert L. Foreman, describes a reversed lapped seam side seal, wherein the outer surfaces of the adjacent sheet portions are brought together in face-to-face relationship with a self-sustaining ribbon of bonding agent therebetween bonding the sheet portions together to form a leakproof seal. However, in this type of seam also, the bonding agent presents an area of nonporous material extending from the inner surface to the outer surface of the filter sheet.

In the manufacture of cylindrical filter elements with ultrafine removal ratings, it is frequently advantageous to use a very thin filter sheet, since a thin sheet presents less resistance to fluid flow than a thick one. Such sheets tend to be fragile, and it is for this reason desirable to reinforce the thin sheet against rupture due to applied pressure in both directions, and against mechanical damage by handling during and after fabrication, by surrounding it with relatively thicker and stronger layers of more open foraminous sheet materials. The resulting multilayer structures with generally tapered or stepped pores are particularly difficult to seal together in a cylindrical form, because an adhesive of sufficiently low viscosity to penetrate the coarse layers tends to be rapidly drawn away by the finer capillarity of the finer layers, with the result that the coarser layers are starved of adhesive, and imperfectly sealed together. For this reason, such seals tend to be very unreliable, and permit passage of solids through the filter elements by edgewise flow through the interposed coarser layers at the seal.

A further difficulty with wide seam sealed cylindrical filter elements is the bonding of end caps to the open ends of the cylinder. The adhesive systems used to bond the end caps to the ends of the side sealed pack usually adhere very well to the filter media layers, since these are porous and consequently absorb some of the adhesive, forming a good bond. The same is not true with respect to the layer of adhesive holding the side seam seal together. In many systems, there is zero adhesion between the adhesive system of the end cap and the adhesive in the side seam seal. Consequently, it frequently happens that a poor seal is formed at the adhesive layer, with the result that a leakage path can be formed under fluid pressure across the filter element. Since the adhesive extends from the outer surface to the inner surface of the filter sheet across the seam, the result is a potential bypass route for fluid which does not pass through the filter.

A potential leakage path of this sort cannot be tolerated in cylindrical filter elements in which the filter sheet is of a porous size such that the filter can be used in filtering out harmful microorganisms such as yeasts or bacteria. The development of such a leakage path in use under high fluid pressure will result in the organisms bypassing the filter, with possibly disastrous consequences.

It is quite difficult in cylindrical filter elements formed of sheet materials to provide a filter cartridge having a sufficient thickness to provide in-depth filtration, a characteristic that is particularly desirable in filtering some kinds of contaminants from fluids. Generally speaking, the longer and the more devious the path that a fluid must follow in passing through a filter, the better the chances of removing any suspended material which is small enough to enter the filter pores. The reason is that such material although capable of passing through the pores tends to become lodged in crevices, nooks and crannies along the pores. The longer and more tortuous the pore, the more nooks, crevices and crannies along its length, and therefore the higher the removal rating for such particles.

Nonwoven fibrous mats and bats are preferred in-depth filter materials, but these materials do not lend themselves to the formation of cylindrical filter elements capable of resisting high differential pressures, because of the low tensile strength of such materials. It is especially difficult to bond the edges of a sheet of nonwoven fibrous material together in a side seam seal. Accordingly, such materials are usually used in cylindrical filter elements only in conjunction with backup filter sheets of the conventional type, which can be bonded together in a side seam seal to prevent the passage of particles that happen to penetrate through the in-depth filter mat or bat. If back flow is possible, such mats also require an external support, so that the mat is in effect confined between concentric materials, of which either or both can be a filter sheet. The requirement for a backup filter increases the cost of such elements, as well as making it more difficult to bond together the several layers to the end caps in a leak-tight seal.

It is also difficult to control the density and porosity of nonwoven fibrous mats and bats. The size of the pores between the fibers is of course dependent upon the spacing of the fibers from each other, which in turn is controlled by the density or the degree of compression of the layer. If the layer be confined between two rigid surfaces, it is possible of course to compress the layer, and to thereby obtain some control over the density, but it is not easy in this way to achieve uniform porosity control from filter element to filter element.

Cylindrical filter elements have also been formed by winding fiber or yarn in opposed spiral or helical laps about a mandrel, to form what is known in the trade as a "wound" or "honeycomb" element. The expression "honeycomb" is used because filters so made are characterized by alternating low or open areas at the interstices between the fibers and high density fibrous or closed areas, where the fibers overlap and cross, extending through the thickness of the element. For this reason such filters tend to be inefficient, since the open areas pass large particles and tend to unload collected solids during periods of varying flow, while the denser areas have lower permeability and therefore see less flow of the fluid filtered. The fibers or yarn used for such elements is spun from relatively coarse fibers, no commercially used cartridge having fibers less than about 12 μm diameter, while most are in the 20 μm or larger range. The fibers in the yarn are parallel or nearly parallel to each other, which represents a very inefficient orientation for filtration purposes.

Still another configuration in which commercially available filter elements are made is accomplished by winding a preformed non woven sheet or web of resin-bonded spun glass fibers around a perforate mandrel into the form of a cylinder. U.S. Pat. No. 3,268,442 to David B. Pall, Sidney Krakauer, Chesterfield Franklin Siebert, Marcel G. Verrando and Cyril A. Keedwell, patented Aug. 23, 1966 proposed to control the density of nonwoven bats by winding up the bat to form a spirally wound cylinder with two or more layers of differing density and diameter, using fibers of different sizes in the spirals. Such elements can have graded density, but they suffer from the necessity of adding a substantial proportion of resinous binder to anchor the glass fibers, and in fact some "media migration" (release of fiber downstream) occurs even when resin binder is used, due in part to the brittle nature of the glass fiber. The use of a resin binder limits the usefulness of the elements, since the resins used for this purpose are attacked by various reagents.

In all of the techniques used previously to form cylindrical filter cartridges, sheet material is used as the starting material, and the dimensions of the cartridge are accordingly circumscribed by the dimensions of the starting sheet. If a filter cartridge of high flow capacity and surface area is required, it is very difficult to achieve it by increasing the size of the filter. One cannot merely increase the length of the cartridge, because of the difficulty of finding sheet material of such a length, and of forming long sheets into cartridges. Consequently, the art has resorted to the use of filter cartridges of relatively standardized lengths, butting cartridges together, end to end, and sealing them together at their ends to form a filter cartridge of a longer-than-standard length. Butting cartridges together is a satisfactory resolution of the difficulty in some respects, but the joints afford additional leakage paths, which can be a source of trouble in operation of the composite.

In accordance with the invention, a process is provided for forming nonwoven thermoplastic fibrous material in a seamless cylindrical configuration and in continuous lengths, by winding fibers as they are melt-spun from a spinning die directly onto a rotating mandrel, and optionally but not necessarily continuously drawing the resulting fibrous cylinder from the mandrel. Such a seamless cylinder can be made in any thickness and length desired, of any thermoplastic polymeric fiber-forming material. Control of the density of the wound cartridge during laydown controls the porosity of the cylinder that is obtained. Such cylinders are particularly useful as filter elements, whether in cylindrical or (collapsed or slit) sheet form.

A particular advantage of this method is that it makes possible the laydown of very fine fibers, which are preferred for filter elements having fine pores and a high proportion of open area. Fibers that are less than $10\mu$ and can range below $0.5\mu$ down to $0.1\mu$ can be spun and laid down onto the rotating mandrel.

Nonwoven fabrics, which find application as filters, as well as for many other uses, such as clothing, clothing interliners, thermal insulation, padding, etc., are made by numerous methods in which the fibers are laid on a moving belt. The manufacturing method may start with natural or synthetic fibers which are dispersed in fluids and then delivered to the belt, or the fibers may be made by forming in situ as for example, by mechanically drawing them from bulk via spinnerets, or by attenuating them using compressed air, steam or other fluids, or by spinning into a liquid bath. The fibers may be bonded to each other by virtue of mechanical entanglement, or by virtue of softening all the fibers, or by softening a lower melting portion of the fibers, or by application of thermoplastic or thermosetting resins, or by inorganic bonding agents such as alumina or silica sols.

All these methods are characterized by the following common factors:

A. A band of material at the edge of the web is non uniform, tapering from full thickness to zero. The "selvedge" must be cut off and discarded, and is a serious cause of loss, especially in narrow webs, and B. To achieve a web of given width, fiber spinning means of width greater than the web must be provided.

In accordance with the invention, a process is provided for making webs which are essentially free of waste. Webs of any desired width can be made independently of the width of the fiber spinning means.

Accordingly, the process of the invention comprises spinning molten thermoplastic material in the form of a plurality of fibers and collecting and winding the fibers directly on a rotating mandrel to form thereon a generally spirally wound layer of randomly oriented heterogeneously intertwined spun fibers of the desired depth and density. In one particular form of the invention, molten thermoplastic resin is spun by a multiorifice die.

As a further feature of the invention, application of a gas blast at the orifices of the spinning die directed generally in the direction of projection of the fibers from the orifices attenuates and disrupts the fibers before or during laydown on the mandrel into discrete lengths. However, any known alternative technique can be used, such as mechanical drawing down or stretching of the soft fibers while they are still plastic.

Control of density of the resulting cylinder can be obtained by spacing the orifices of the spinning die at different distances from the rotating mandrel, and attenuating the fibers before laydown on the mandrel. A spinning die of course has a plurality of such orifices. If the face of the spinning die bearing the orifices is arranged at an angle to the mandrel, some orifices will be at a greater distance from the mandrel than others. The result is that some fibers travel over a greater distance than others, before they are collected on the mandrel. The shorter the distance the fibers travel between the orifice and the mandrel, the greater the density of the layer collected therefrom. Consequently, by arranging to lay down first the fibers from those orifices closest to the mandrel, a greater density is obtained in the portion of the layer that is closest to the mandrel than in the portion where the fibers come from orifices at a greater distance from the mandrel. Alternatively, the fibers from orifices at the greatest distance from the mandrel can be laid down first. It is possible in this manner to lay down a cylinder having a greater or lesser density at the center, gradually or abruptly decreasing or increasing towards the outer surface of the cylinder.

The process affords an unlimited flexibility in the dimensions and number of orifices as well as the spacing of the orifices in the spinning die. Large size continuous dies such as are required to lay a wide web on a moving belt are difficult to construct, and certain size limitations cannot be practically exceeded, but in the process of this invention there is no limit on the number and location of the spinning dies. Because each element of the simultaneously rotating and axially translating web is impinged upon equally by every part of each die used, regardless of its location, the dies can be arranged about the mandrel in any spacing and orientation, to provide for a laydown of any desired number of fibers per unit interval. Multiple narrow dies which are easier and less costly to construct can be used, in a number to provide for fabrication of the web at any desired size and rate of production.

Use of multiple spinning dies makes it possible to lay down different fibers in a predetermined sequence, so as to lay down fibers of different softening point, and then further bond them together, or to bond the web to other web or webs by softening the lower softening point fibers, or fibers of different solvent susceptibility, so as to render the surface of one kind tacky by solvent, but not the other, or fibers of different tensile strength, so as to strengthen the cylinder, or fibers of differing diameter, and so on.

The finished cylinder of nonwoven fibrous sheet material can be drawn off the mandrel along the longitudinal axis of the mandrel and this can be done continuously as the fibers are being spun, so that the cylinder is continuously formed at one end of the mandrel, and continuously withdrawn at the other, while the mandrel is rotating. Withdrawal of the cylinder from the mandrel is facilitated by tapering the mandrel so that it has a larger diameter at the cylinder-forming end than at the cylinder-withdrawing end.

It is not necessary to apply a bonding agent or adhesive to hold the fibers in the resulting nonwoven fibrous web together. The fibers become thoroughly entangled during laydown on the mandrel, and are maintained in juxtaposition in the web by virtue of this entanglement. If the fibers are soft and adherent at the time they strike the mandrel, they may become bonded together at their crossing points in the course of windup on the mandrel. The process can however be controlled so that the fibers while molten at the time they emerge from the orifices of the spinning die harden, become solidified, and are non tacky at the time they reach the mandrel and are wound up. Such fibers have their dimensions fixed at the time the cartridge is formed and better control of the size of the pores is therefore obtained, since the fibers have little or no tendency to become distorted in a random manner during windup.

The seamless cylinder that is obtained can be treated in any desired manner, and then is cut into selected lengths. If the cylinder is relatively rigid, it will retain its cylindrical shape, and the lengths can then be formed into filter cartridges with or without the application of internal and/or external supports and end caps, using conventional techniques. Non rigid cylinders can be provided with internal or external supports, or may be used as bags with flow from inside to out, with one or both ends open.

As an alternative procedure, however, if the fibrous sheet material is sufficiently flexible, the cylinder can be flattened, and wound up as a flattened double layer sheet with the edges held together and therefore nonraveling, from which sections of sheet can be cut off in the lengths desired. The cylinder can also be slit longitudinally, and opened out to form a single-layer filter sheet. Both such types of sheets are useful as filter elements. While the cylinder and sheet materials of the invention find particular application as filter elements, they are useful generally in the manner of nonwoven fibrous webs, as insulation, liners or interliners in building construction, packaging materials, clothing, refrigeration and heating systems, carpeting and other floor coverings, engine housings for machinery, automobiles, trucks and buses, farm equipment and machine tools, to mention only a few examples.

Thus, a special feature of the invention is the provision of a seamless filter element, which can be in cylindrical or sheet form, or indeed any other configuration obtainable by shaping these two basic forms, comprising a generally spirally wound layer of randomly oriented heterogeneously intertwined spun fibers less than $10\mu$ and preferably less than $5\mu$ diameter, of any desired depth and density, and having a voids volume of at least 70 percent and preferably at least 85 percent.

Preferred embodiments of the process and products of the invention are shown in the flow sheets of the drawings, in which.

The process of the invention is applicable to any thermoplastic resinous material that can be spun through the orifices of a spinning die or spinnerette to form fibers that are self-supporting. Exemplary thermoplastic materials include polyamides, polyacrylonitrile, linear polyesters such as esters of ethylene glycol and terephthalic acid, polyvinylidene chloride, polyvinyl chloride, copolymers of vinyl chloride and vinyl acetate, polyvinyl butyral, polyvinyl acetate, polystyrene, silicone, resins, polypropylene, polyethylene, poyltrifluorochloroethylene, polymethylpentene, and polyisobutylene. Also within this category are thermoplastic cellulose derivatives, such as cellulose acetate, cellulose propionate, cellulose acetate-propionate, cellulose actate-butyrate and cellulose butyrate. Non resinous materials such as glass can be similarly processed.

The fibers can be spun to any desired diameter. Monofilaments are usually preferred but multifilaments can also be spun. Both are referred to herein generically as fibers. The filaments can have any desired cross-sectional configuration, generally round, but also elliptical, square, hourglass, triangular, pentagonal, V- or U-channel, T-shaped or I-shaped, or other cross-sectional shapes, and can be solid, tubular, or cellular or foamed.

The process can utilize filaments of any diameter. Coarse fibers have diameters from $10\mu$ to 50 or $100\mu$ or higher. Fine fibers have diameters below $10\mu$ and preferably below $5\mu$ down to $0.1\mu$ or less. Fine filaments generally give a nonwoven web having a finer pore size, and coarse filaments generally give a nonwoven web having a larger pore size.

Filaments of different sizes can be used in different regions of the cylinder. For example, fine fibers from one set of orifices can be laid down first in the interior portion of the cylinder, and coarse fibers from another set of orifices can be laid down in the exterior portion of the cylinder. This will give a cylinder of graded and tapered pore size, decreasing from coarse to fine from the exterior to the interior of the cylinder in the manner described in U.S. Pat. No. 3,158,532 to David B. Pall and Cyril A. Keedwell patented Nov. 24, 1964. Blends of fine and coarse fibers can be laid down throughout the depth of the filter cylinder by employing a spinning die having mixed diameter orifices, with a variety of diameters extending from fine to coarse, for example.

Any conventional spinning die or spinnerette can be used. Such dies are available and well known in the fiber-spinning art, and form no part of the instant invention. The term "spinning die" will be understood to include spinning nozzles; spinnerettes; reservoirs faced with a plate including a plurality of orifices in any desired size and pattern; and centrifuges or rotors having a plurality of orifices about their periphery, through which the fibers are spun by centrifugal force. Fiberizers, rotating wheels and discs, and like materials are also included.

Figures 2, 3, 7:
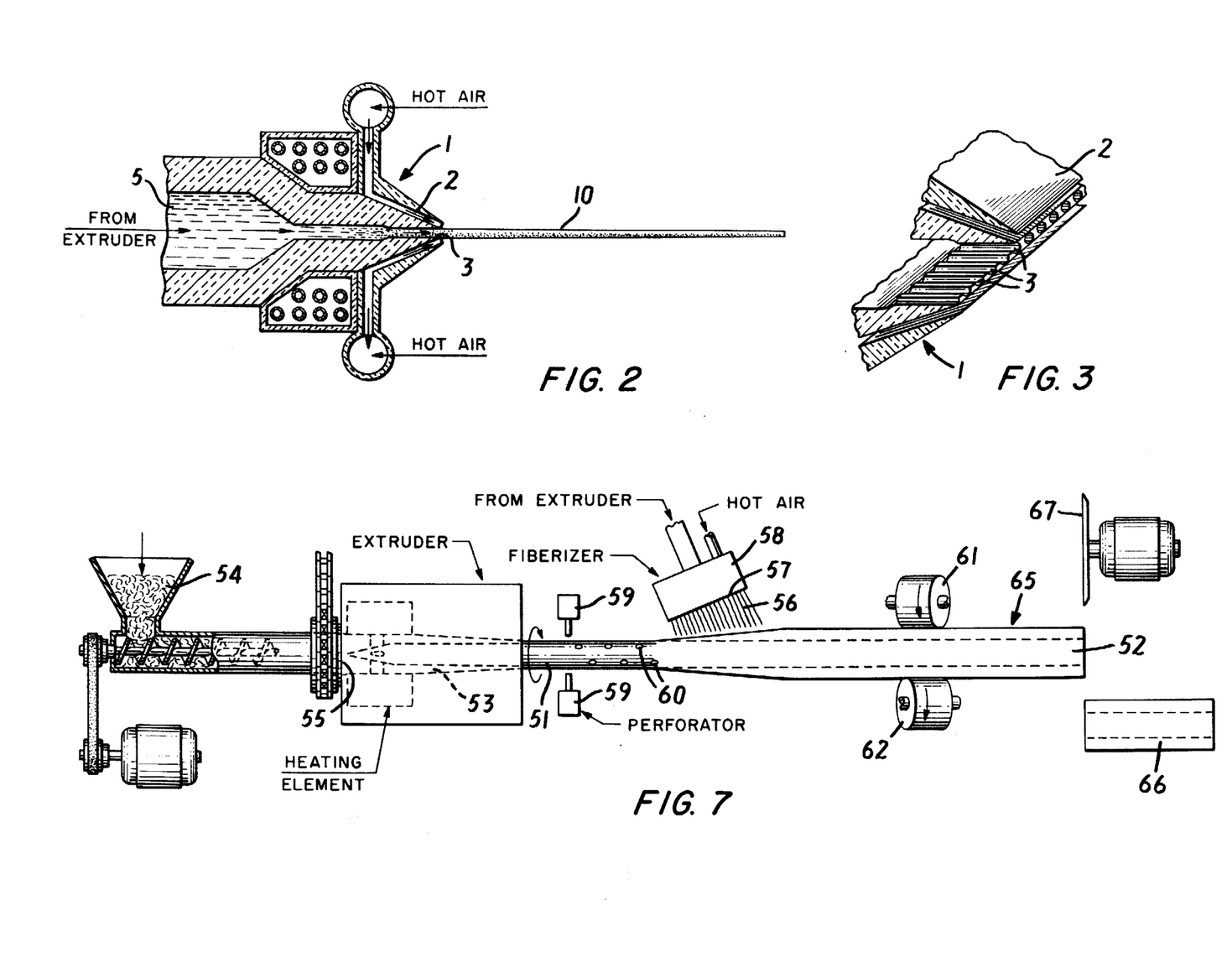
FIG. 2 shows in longitudinal section one orifice of the spinning die of FIG. 1, having an array of orifices embraced by nozzles for directing a gaseous blast for attenuating and disrupting the molten filaments spun through the orifices.
FIG. 3 shows in perspective the spinning die of FIG. 2.
FIG. 7 represents a third embodiment of the process of the invention in which the cylinder is laid down on a tubular forminous mandrel which is also continuously extruded through a die and itself serves as a permanent core for the resulting filter element, which is accordingly completed simply by applying end caps.

A preferred type of spinning die has openings arranged circumferentially about the individual orifices, or array thereof, adapted to discharge a gas at high but controlled velocity along the central axis of the orifice. The gaseous blast attenuates the fibers, and tends to disrupt them so that they are broken up into discrete lengths, which can be adjusted according to the velocity and volume of the gaseous blast. If a centrifugal rotor is used, the openings for discharge of the gaseous blast can annularly surround the rotor. If a plurality of spinning orifices or nozzles are used, the blast can be emitted from jets arranged about the circumference of the individual jets or nozzles. In the case of a spinning die with a plurality of orifices in a plate, the blast can be emitted at the periphery of the spinning die. A typical arrangement is shown in FIG. 2, where a spinning nozzle is illustrated.

The gaseous blast can be heated, so as to retard the cooling of the fibers. The gaseous blast can also be a cold blast, to accelerate the cooling of the fibers, and thereby their rate of solidification. Thus, by the use of the gaseous blast the time interval during which the fibers harden and solidify can be controlled. If the fibers are kept hot longer, the attenuation is increased, and if the fibers are cooled more rapidly, the attenuation is decreased. Thus, in this way some control over the length of the fibers is also obtained.

The polymeric material of which the fibers are spun is maintained in molten condition at the time of spinning. The temperature of the melt is adjusted to obtain a molten material of the desired viscosity at the time the material emerges from the orifice. This also gives some control over the degree of attenuation and the lengths of the fibers, since a more viscous material tends to be more cohesive and less attenuated by the gaseous blast and since it is generally at a lower temperature, will also cool more quickly and therefore solidify in a shorter time.

The distance between the orifices of the spinning die from the rotating mandrel is controlled so that by the time the fibers reach the mandrel they have cooled sufficiently so as to be shape-retaining. They may still be soft, and therefore adhesive, so that they tend to stick together at their crossing points. They may also be fully solidified, so that they do not adhere to one another, in which condition they retain their shape better. They are collected in a randomly oriented heterogeneous intertwined arrangement on the mandrel, since virtually no control is exercised over the path the fibers follow in their trajectory from the spinning die to the mandrel. By the time the fibers reach the mandrel, they are either already broken up or disrupted into discontinuous lengths, or they are still attached to the orifice from which they are spun by a portion which is molten. In all probability, therefore, there is very little attenuation of the fibers by the rotating motion of the mandrel, and any attenuation is usually obtained only by the gaseous blast and by the normal attenuation obtained by the weight of the solidifying or solidified fiber applied to the molten portion of the fiber at the orifice. However, mechanical attenuation of the fibers before laydown can be achieved using conventional attenuation techniques, such as drawing the fibers while they are still plastic.

The fibrous material collected on a rotating mandrel tends to be laminar in form, the material collected during each succesive rotation forming a single lap or layer. If the distance from the die to the mandrel or cylinder collecting surface is small, 3 inches to 4 inches, the fibers in the adjacent layers become firmly entangled, such that it becomes difficult or impossible to distinguish or separate the layers. If the die-to-collecting-surface distance is relatively large, 12 inches to 18 inches, the layers can be separated from each other but adhesion is sufficient to permit the product to be very useful in many filtration applications. The thickness of each layer in the lapped web obtained depends upon the rate of the rotation of the mandrel, which from a practical point of view is not critical between wide ranges. As a rule, it is desirable for the mandrel to rotate at a rate such that each portion of the collected web cylinder contains two or more layers.

If the distance from the orifices of the spinning die to the collecting surface is relatively large, and the spacing of the orifices relatively coarse, there may be "roping" (intertwining or spiral twisting of filaments to produce a heavy yarn or rope) of the filaments from adjacent orifices before laydown. Some roping can be tolerated without a materially harmful change in the characteristics of the cylinder. As roping increases, however, the cylinder begins to acquire the characteristics of a honeycomb cylinder, which may be undesirable.

In general, at a distance of from 3 to 4 inches, there is no roping, while at a distance above 12 inches roping becomes severe. Over the intervening distances, from 4 inches to 12 inches, roping appears and becomes increasingly severe. The distance can thus be adjusted as required to avoid or control the amount of roping.

For liquids filtration, uniformity of laydown is important, and the distance is thus preferably from 3 to 5 inches. For gas filtration, it is desirable to obtain high voids volume in order to reduce pressure drop across the nonwoven web, and the distance is thus preferably from 7 to 10 inches to obtain a lower density laydown with a moderate proportion of roped filaments.

Another way of controlling roping is to increase the spacing of the orifices of the spinning die. In a conventional spinning die, the orifices are rather close together, and a spacing of twenty to fifty orifices per linear inch is standard. This spacing gives severe roping at distances over 12 inches.

On the other hand, an increase of the spacing to from ten orifices per linear inch down to one orifice per linear inch virtually precludes if it does not eliminate roping. While this increases the size and length of the spinning die or dies, this is perfectly acceptable in the process of the invention.

By placing the spinning die or die combination so that some orifices thereof are closer to the rotating mandrel than others, and attenuating the fibers before laydown, using a gaseous blast or other attenuating means, it is possible to vary the density of the mat or web that is wound up on the mandrel. The distance between the orifice and the collecting surface determines the density of the mat; the shorter the distance, the higher the mat density. Accordingly, by varying the distance, such as by setting the spinning die at an angle in the manner shown in FIG. 1, the density in the resulting mat is easily controlled. An effect is obtained at very small angles, as small as one or two degrees, but normally the angle would be within the range from 5° to 45°, the angle being measured between the orificed surface of the spinning die and the longitudinal axis of the mandrel. In the preparation of variable density mats, the spinning die may have a flat or plane surface bearing the orifices, or one or more dies providing angled or radiused surfaces, which produce a less linear variation in density from the inner to the outer diameters of the web, may be preferred.

If each orifice in the spinning die is at a gradually increasing distance from one end to the other of the die or dies, the resulting cylinder will have a gradually increasing or decreasing density. Rather sharply defined stepped layers of differing densities can be obtained by arranging the orifices of the spinning die in groups, with each orifice in each group being at the same distance from the mandrel. In this event, the spinning die surface is arranged in a series of steps with respect to the mandrel. Other variations will be apparent.

Cylindrical webs or tubes can be formed in a continuous or an intermittent manner.

If the intermittent system is used, the mandrel is rotated in the stream of fiber effluent from the fiberizing die until a cylinder of the desired thickness is built up. The cylinder so formed then is removed from the stream of fibers, either with the mandrel, or by rapidly pulling it off the mandrel. A new cylinder is then built up on the mandrel or its replacement.

The tube which is so formed may then have its end trimmed. At this point, if thick enough to be self-supporting, it forms a usable filter element. If the tube is relatively thin-walled, it will still function as a finished element if it is provided before or after forming with a foraminous internal core or external support.

In the continuous mode of operation, the cylinder formed on the mandrel is continuously withdrawn from the mandrel; in this manner, cylinders of any desired length can be made.

Thickness of the web laid down on the mandrel is adjusted in the intermittent mode of operation by the diameter of the mandrel, the rate at which the fibers are extruded, the density of the collected fibrous structure, and the time allowed for laydown. In the continuous mode, thickness is adjusted by the diameter of the mandrel, the rate at which the fibers are extruded, the density of the collected fibrous structure, and the rate at which the cylinder is withdrawn from the laydown zone.

Figure 1:
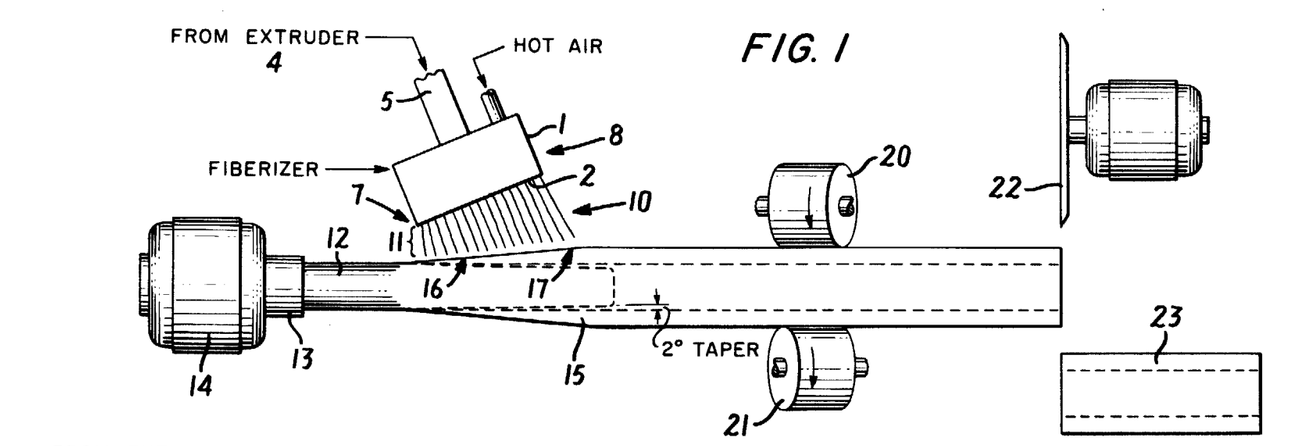
FIG. 1 represents an embodiment of the process of the invention for producing a cylinder of graduated density from the inner to the outer surfaces thereof in selected cut lengths useful as a filter.
Figure 6:
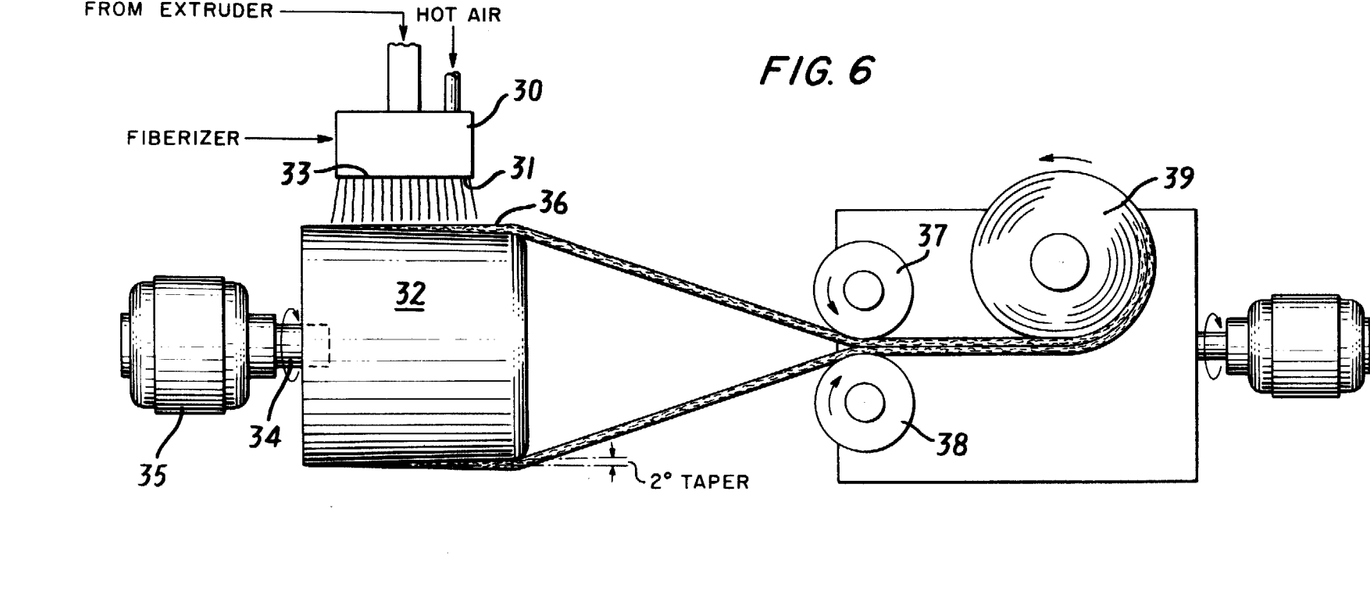
FIG. 6 represents another process embodiment in which a cylinder of relatively flexible fibrous sheet material is flattened after being drawn off from the mandrel to form a bilayered sheet material, and then rolled up.

The rotating mandrel on which the mat is laid down can be rotated in a fixed position, in which event the finished cylinder is drawn off the end of the mandrel, using for example a pair of drawing rolls, in the manner shown in FIG. 1 or rolled up in a flattened state as shown in FIG. 6. To facilitate slipping off of the cartridge from the mandrel, the mandrel can be tapered so as to diminish in diameter towards the end at which the cartridge is drawn off.

When making relatively thicker wall tubes, for example with wall thickness in excess of ¼ inch to ½ inch, the fibers may become softened due to the extended exposure to the impinging flow of hot gas. This is particularly the case where the die to mandrel distance is small, for example less than 4 inches to 7 inches. In order to avoid the consequent densification and shrinkage, it is often desirable to introduce cooling, which can be accomplished by various means, for example by internally cooling the collecting mandrel, as by flowing cold water through it, or by cooling the fibrous mass by blowing cold or room temperature air at and through it from the side opposite the die, or by blowing cold air through an appropriately perforated mandrel.

After the cylinder is drawn off from the mandrel, it can be further processed in various ways. It can for example be impregnated with a resin binder or impregnant to obtain a more rigid structure, or to reduce porosity. Additives can also be added thereto. For instance, if the cartridge is to be used for water treatment purposes, it can be impregnated with a bactericide, or fungicide, or other water-treating material which is to be dissolved in the water passed through it.

Additives can also be incorporated by feeding them into the stream of fibers from the spinning die orifices before laydown. Such additives can include diatomaceous earth, glass or other organic or inorganic fibers, surface-active agents, filters such as silicone resins, polytetrafluoroethylene, hydrophobic silica, and similar agents, and binder resins in liquid droplets or solid form.

The cylinder can be cut into lengths, and processed further to form a cylindrical filter element. This may include the application of internal core and external sheath supports, and end caps to each open end of the cylinder, sealing the end caps to the cylinder, core and sheath using an adhesive. The end caps will be shaped so as to fit within the filter assembly in which the resulting filter element is to be used.

While the process of the invention is particularly adapted to form cylindrical filter cartridges which are used in their cylindrical shape, the process also makes it possible to form sheets having the characteristics of nonwoven fibrous webs in continuous lengths and considerable widths, useful as filters and for many other applications. The width of such a sheet is determined by the diameter of the rotating mandrel. A double sheet can be formed simply by collapsing the cylinder drawn off the mandrel, and a single layered sheet can be obtained by slitting one side of this tube and opening it out, so that the resulting sheet has a width equal to the circumference of the mandrel. The sheet can also be cut into any desired widths less than this circumference.

The apparatus shown in FIGS. 1 to 3 includes a spinning die 1 whose face 2 has an array of orifices 3 of uniform size. (See FIGS. 2 and 3.) The spinning die is supplied with molten thermoplastic polymeric material such as polypropylene from a reservoir 4 which is fed by the inlet line 5 carrying molten thermoplastic polymeric material from an extruder or other source of supply (not shown) under a pressure sufficient to project the material through the orifices of the die, thereby forming a plurality of molten fibers 10.

The fibers traverse a short air space 11, in the course of which they are attenuated and solidify, and are collected on a tapered rotating mandrel 12, one end of which is held to the shaft 13 of an electric motor 14, which is arranged to rotate the mandrel at a relatively slow speed, approximately 3 to 5 feet per second in this instance. The fibers are randomly oriented and heterogeneously intertwined as they are wound up on the mandrel, forming a generally spirally wound mat of nonwoven fibrous material 15.

The spinning die is set at an angle of approximately 20° to the mandrel, so that the orifices at the lower end 7 are much closer to the mandrel than the orifices at the upper end 8. The result is that the fibers emerging from end 7 have a shorter distance to travel before they reach the mandrel than the fibers emerging from end 8. Consequently, the portion 16 of the nonwoven fibrous mat formed of fibers laid down from the orifices at the end 7 has a higher density than the portion 17 of the mat formed of fibers laid down from the orifices at the end 8.

The cylinder 15 as it is being formed is drawn continuously to the right by the canted rollers 20 and 21. By the time an element of the cylinder has reached the end of the mandrel, it has reached its final thickness, and is then pulled off the mandrel. A taper of the mandrel, generally 2° or more, facilitates this removal. The cylinder then approaches the cutoff wheels 22, where it is separated into lengths 23.

Figure 4:
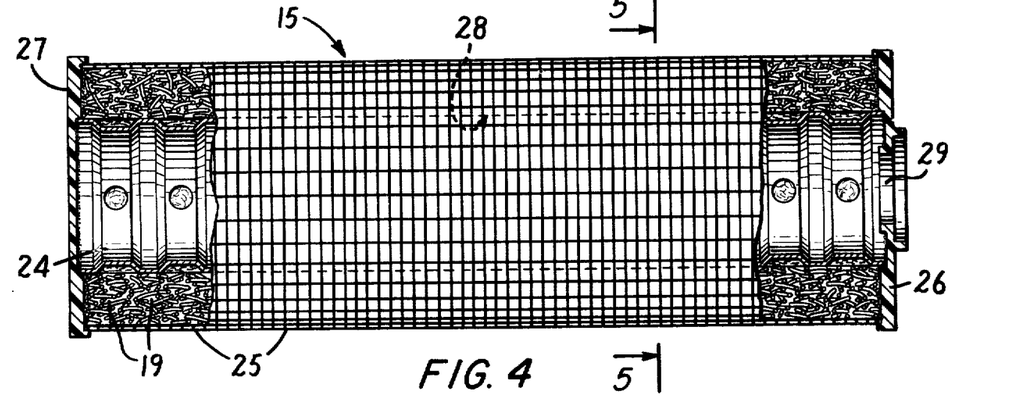
FIG. 4 represents in longitudinal section a cylinder obtained by the process of FIG. 1 made into a filter cartridge enclosed by end caps and supported on an internal core.
Figure 5:
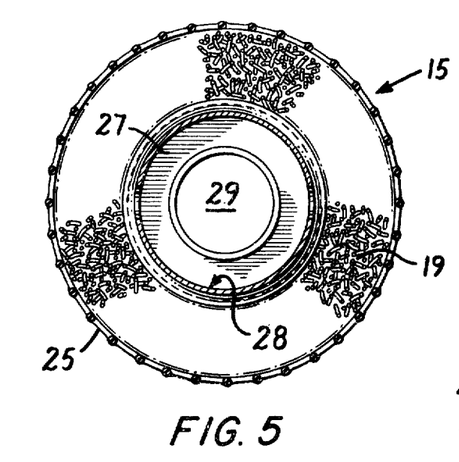
FIG. 5 represents a cross-sectional view taken along the line 5—5 of the filter cartridge of FIG. 4.

The resulting cylinder lengths can be used directly as filter cartridges, or they may be converted by inserting cores 24 and sheaths 25, and then apply end caps 26, 27, thereby forming a finished filter element as best seen in FIGS. 4 and 5. The open central passage 28 of core 24 is in fluid flow connection with the central opening 29 in end cap 26. End cap 27 is closed, thus compelling fluid to pass through the filter sheet 15 in order to reach the central passage 28, when the filter element is inserted in a filter assembly. The gradation in density of the filter element from the interior to the exterior is clearly evidenced by the increasing size of the pores 19 in the filter element.

The apparatus shown in FIG. 6 has a spinning die 30 whose orificed face 31 is arranged parallel to the longitudinal axis of the mandrel 32 so that all of the orifices 33 are equidistant from the surface of the mandrel. This produces a cylinder of nearly uniform density from the interior to the exterior surface. In this case, also, the rotating mandrel 32 is tapered and attached to the shaft 34 of a motor 35, but the mandrel in this case is of considerably larger diameter than the mandrel 12 of FIG. 1, and has a large circumference. The mat 36 that is laid down on the mandrel is not intended to be used in tubular form, but instead is flattened as it is withdrawn from the mandrel by the flattening rollers 37, 38 and then rolled up to form a spiral roll 39. The result is a double-layered sheet of nonwoven fibrous material, the side ends of which are nonravelling because they are interconnected in collapsed tubular form. This is consequently a very coherent filter sheet of nonwoven material, whose fibers are nonmigrating.

A sheet double this width can be obtained by slitting the tube along one side, imposing a cutting knife between the end of the mandrel and the flattening rolls, which in this modification would be drawn off and opened up so that it would be spread out to form a one layered sheet, double the width of the flattened tube. The opened out sheet would then be wound up, in the manner shown in FIG. 6.

Instead of using a large diameter mandrel, as shown, and flattening the tube, the tube can also be withdrawn and retained in a tubular configuration, in the manner shown in FIG. 1, in which event it can be made into a cylindrical filter as shown in FIGS. 4 and 5. It can also have a foraminous spacer inserted in the center, and then formed into a spirally wound filter element of the type shown in FIGS. 11 and 12.

In the processing system shown in FIG. 7, the mandrel 51 forms the core of the resulting filter element, and the filter cylinder is not separated therefrom after it is formed. The mandrel 51 is made of thermoplastic polymeric material, but the material need not be fiber-forming and is extruded continuously in tubular form with an open central passage 52, in a continuous length, in the same manner as the filter cylinder that is laid down thereon.

The system thus includes a rotatable tubular extrusion die 53 supplied with thermoplastic extrudable polymeric material 54 such as polypropylene through the feed inlet 55, from which the continuously rotating rigid tubular mandrel and core 51 is continuously extruded into a position to receive the fibers 56 spun from the orifices 57 of spinning die 58. Prior to receiving the fibers, the core 51 is perforated or slit by cutting means 59 to provide a plurality of apertures 60 for passage of fluid therethrough into the central open passage 52 of the core.

As an extrudable polymeric material, there can be used not only any of the thermoplastic materials used in forming the fibers but also, in addition, material such as polycarbonates, polyoxymethylene, polytetrafluoroethylene, polychlorotrifluoroethylene, phenol-formaldehyde, urea-formaldehyde, melamine-formaldehyde, epoxy and polyvinyl fluoride polymers.

Figure 8:
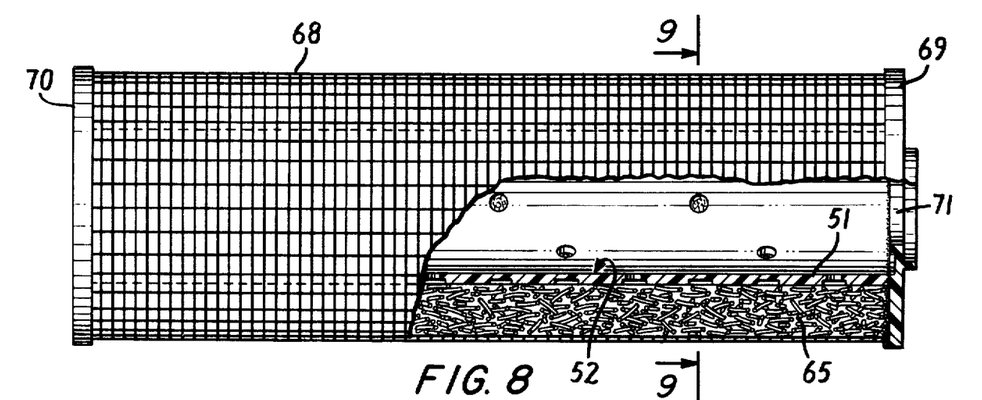
FIG. 8 represents a longitudinal section through a filter element obtained by the process of FIG. 7.
Figures 9, 13, 14:
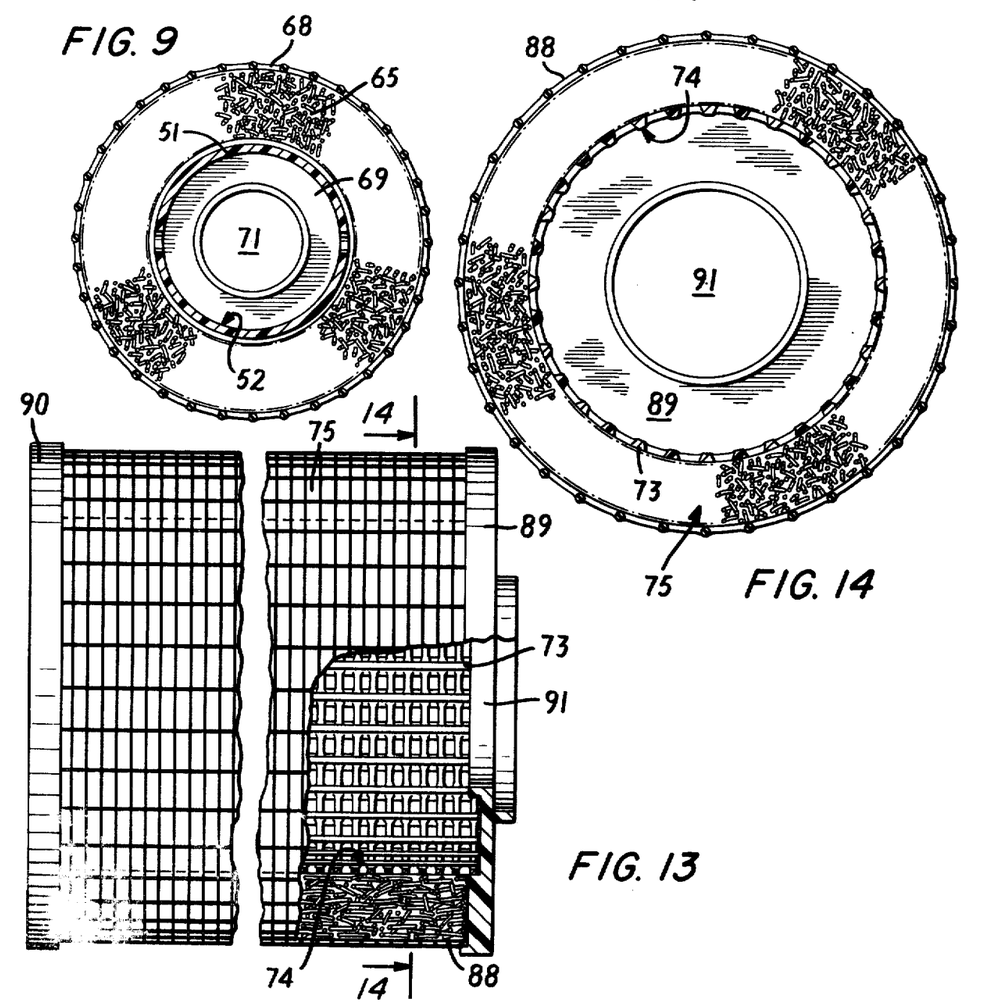
FIG. 9 represents a cross-sectional view taken along the line 9—9 of FIG. 8.
FIG. 13 represents a longitudinal section through a filter element obtained by the process of FIG. 10.
FIG. 14 represents a cross-sectional view taken along the line 14—14 of FIG. 13.

The fibers 56 are spun onto this mandrel 51 in the same manner as in FIG. 1, and the composite core-plus-filter element 65 formed thereon is drawn forward by the canted rollers 61, 62. Selected lengths 66 of filter element can then be cut off by the cutoff wheels 67. The resulting filter cartridge can be fitted with an external sheath 68 and end caps 69, 70 producing a finished filter element as shown in FIGS. 8 and 9. The end cap 69 has a central opening 71 in fluid flow connection with the central passage 52 of the core 51, while end cap 70 has no aperture. Consequently, fluid entering the central passage 62 must pass through the filter sheet when the filter element is inserted in a filter assembly.

Figure 10:
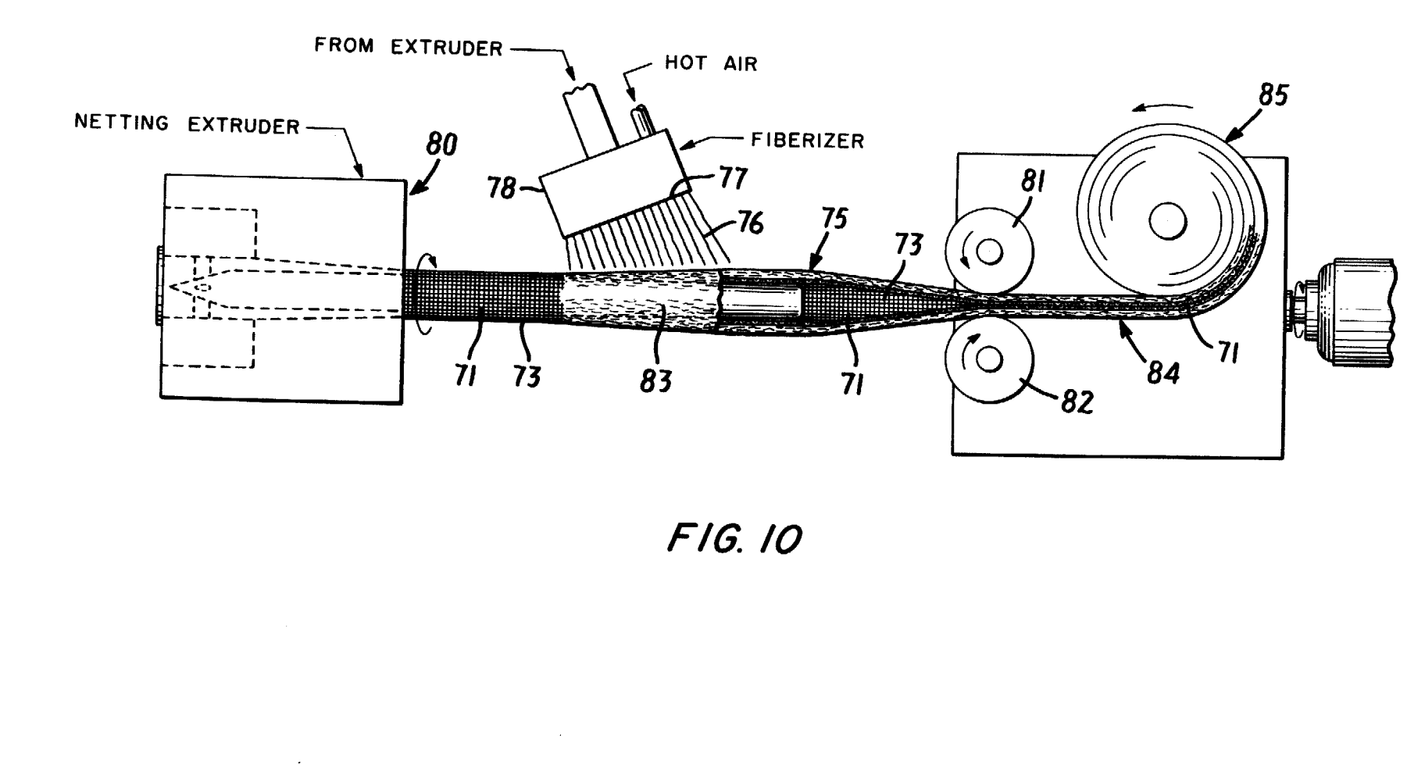
FIG. 10 represents a fourth embodiment in which a cylinder is laid down on a tubular foraminous mandrel that is preformed by an extrusion or other forming process and itself serves as a permanent core for the resulting filter element.

In the processing system shown in FIG. 10, the the preformed mandrel 71 also forms the core of the resulting filter element, which can be drawn off in cylindrical form as shown in FIG. 7 or flattened with the core within as a foraminous spacer, as shown in FIG. 10. Thus, the filter cylinder is not separated therefrom after it is formed.

The mandrel 71 is extruded in the form of netting, in a diagonal open mesh of thermoplastic polymeric material. Since in manufacture the netting is extruded continuously, it can be in quite long lengths. The netting is in tubular form with a plurality of apertures 73 for passage of fluid therethrough into the central open passage 74 thereof. The netting 71 is continuously fed between the canted rollers 79, 80, supported on mandrel 83 which is supported at its far end on the core of the extrusion die 80. The netting 71 moves into position to receive the pore fibers 76 spun from the orifices 77 of spinning die 78.

As the extrudable polymeric material, there can be used not only any of the thermoplastic netting materials used in forming the fibers, but also, in addition, materials such as polycarbonates, polyoxymethylene, polytetrafluoroethylene, polychlorotrifluoroethylene, phenol-formaldehyde urea-formaldehyde, melamine-formaldehyde, epoxy and polyvinyl fluoride polymers.

The fibers 76 are spun onto this mandrel 71 in the same manner as in FIG. 1, and the composite core-plus-filter element 75 formed thereon is drawn forward and flattened by rollers 81, 82, and the resulting bilayered sheet 84 with internal bilayered netting 71 is then wound up on storage roll 85.

Figure 11:
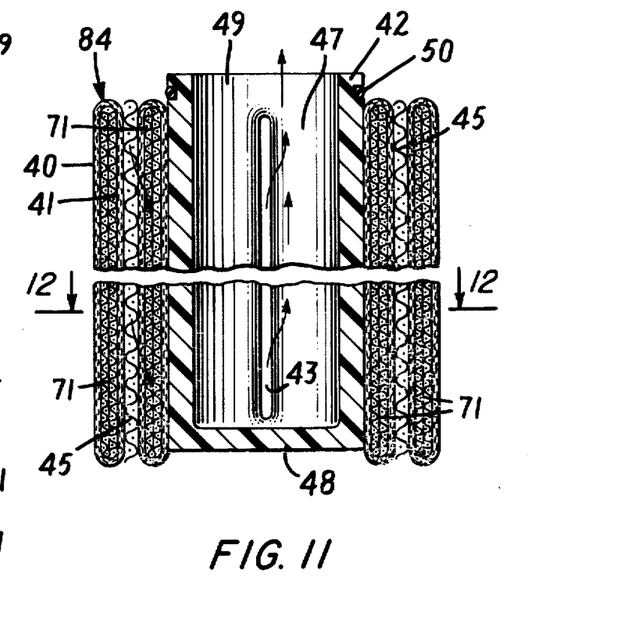
FIG. 11 represents in longitudinal section a flattened spirally wound filter element prepared by the process of FIG. 10, made into a filter cartridge supported on an internal core.
Figure 12:
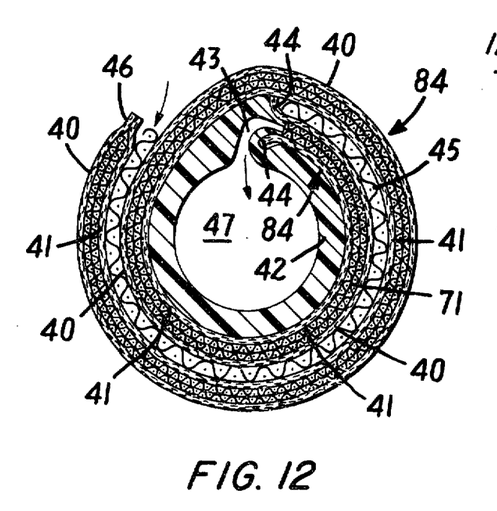
FIG. 12 represents a cross-sectional view taken along the line 12—12 of the filter cartridge shown in FIG. 11.

FIGS. 11 and 12 show a spirally wound filter element made of the double-layered collapsed tubular sheet material 84, 71 that is obtained using the system of FIG. 10. The tube has two layers 40 and 41 which are attached together at their edges because of the tubular nature of the sheet.

The double-layered tubular sheet 84, 71 is spirally wound on a cylindrical core 42 provided with a longitudinal slot 43. One end 44 of the tube 84 is attached to the slot, and the tubing is then rolled several turns around the core, interleaved with another strip 45 of netting which serves as an external spacer for fluid flow. The internal netting 71 serves as an internal spacer for fluid flow. The outer end 46 of the tubular sheet is sealed. Fluid passes edgewise along the interleaved external strip 45, thence through the tube walls 40, 41, into the exterior of the tube 84 along the netting 71 into the core 43 and thus into the open interior 47 of core 42, which is closed at one end 48 so that all the fluid is delivered through the aperture 49 at the other end. The core has an O-ring seal 50 for sealing attachment to a filter assembly (not shown).

In an alternative configuration, strips of flat tubular web with the internal tube of flat tubular netting can be closed at one end, and the other attached to a tube sheet, by means of which a multiplicity of such tubes are connected to a single outlet, forming a large area "parallel plate" filter.

This composite core-plus-filter element 75 can also be drawn off in cylindrical form as shown in FIG. 1. Selected lengths of filter element can then be cut off. The resulting filter cartridge can be fitted with an external sheath 88 and end caps 89, 90, producing a finished filter element as shown in FIGS. 13 and 14. The end cap 89 has a central opening 91 in fluid flow connection with the central passage 74 of the core 71, while the end cap 90 has no aperture. Consequently, fluid entering the central passage 74 must pass through the filter sheet, when the filter element is inserted in a filter assembly.

The following Examples in the opinion of the inventor represent preferred embodiments of the invention.

EXAMPLE 1

A paper-board tube 3½ inches outside diameter serving as a mandrel was placed approximately 4 inches from the nozzles of a 10 inch wide extrusion die or fiberizer fitted with twenty 0.015 inch diameter resin orifices or nozzles per linear inch, these orifices or nozzles being surrounded by hot air effluent from slots located above and below the nozzles. Polypropylene resin was extruded through the orifices at a rate of approximately 11 lbs/hour, and the air flow was adjusted to attenuate the spun fibers to a diameter of 4 microns. The paper-board tube was rotated at about 40 RPM, while being gradually moved axially away from the die, until an approximately ⅜ inch wide web of entangled fibers had collected on the tube. The resultant taper-ended cylinder was removed from the mandrel, and the ends trimmed to 8.56 inches long. The outside diameter was 4¼ inches and the internal diameter was 3 15/32 inches. The cylinder was strong and rigid. While examination of the cut ends showed a laminar appearance, it was not possible to unravel the cylinder by picking at the last lap with one's finger nails. Microscopic examination showed a quite uniform pore diameter of approximately 15 microns. Ability to remove particles was further checked by bubble pointing, which indicated the largest pore diameter to be 9.5 microns. The inner surface of the cylinder appeared to have a greater density than the outer surface. The cylinder was useful for filtering gases for liquids.

EXAMPLE 2

A porous filter cylinder of polypropylene fibers was made in a manner similar to Example 1, except that a piece of one inch diameter round wooden dowling was used as a mandrel and the distance from the die nozzle to the mandrel was 12 inches. A much lower density, considerably softer filter cylinder was obtained, which after trimming was 2.85 inches of outside diameter × 1 inch internal diameter × 7.7 inches long. Visual examination showed a quite uniform pore diameter of approximately 30 microns. The filter cylinder was particularly useful for filtering gases having the very low pressure drop of only 0.03 psi at 1.4 cfm of air.

EXAMPLE 3

A 10 inch wide fiberizing die mounted at the end of a plastic extruder capable of spinning filaments from two hundred orifices 0.015 inch in diameter at a rate within the range from about 11 pounds per hous to about 37 pounds per hour was arranged in the manner shown in the system of FIG. 1, at an angle of 20° to the mandrel. The spinning die was equipped with a heating system, so that it could be held at from 400° to 700°F, to maintain the plastic material (in this case, polypropylene) molten during spinning and to supply hot air for attenuation. The distance between the orifices and the mandrel varied from 6 inches to 14 inches at the nearest and furthest points, respectively, as shown in Table I. The mandrel was rotated at a rate of 13.5 revolutions per minute, and was tapered, so that the diameter at the fiberimpact end was 1.06 inch and the diameter at the withdrawal end was 0.88 inch. The cylinder so formed was continuously drawn off the cantilevered end of the mandrel, and cut into nine ⅝ inch lengths. The cylinders were strong, self supporting, coherent migration-free structures, with visibly denser structure nearer the inside diameter. Average temperature of the extrusion die was 650°F, and average air temperature was 635°F. Various tests were run on the resulting cylinders, with the results shown on Table I. The maximum particle passed data refers to removal of solids suspended in water; removal from aerosols is considerably more efficient. The cylinders obtained were extremely useful for filtering both liquids and gases.

TABLE I

| RIGID FIBROUS TUBES MADE IN CONTINUOUS LENGTHS | | | |
|---|---|---|---|
| Run No. | 1 | 2 | 3 |
| Die to mandrel distance, in forming end | 7 | 12 | 14 |
| Die to mandrel distance, in pull-off end | 11 | 16 | 16 |
| Polypropylene feed rate lbs/hr. | 20.6 | 37 | 37 |
| Air pressure psi | 11 | 13 | 16 |
| Internal Diameter Inches | 1.04 | 0.94 | 1.01 |
| Outside Diameter Inches | 2.59 | 2.25 | 2.40 |
| Weight of 9-5/8 in. length grams | 93 | 59 | 69 |
| Voids volume % | 84 | 88 | 87 |
| Δp at 1.4 scfm of air, inches water column | 11.3 | 9.9 | 10.2 |
| First B. P. in alcohol inches water column | 16.4 | 17.4 | 17.7 |
| Max. particle passed microns | 8 | 7 | 7 |
| Element is 99% efficient at microns | 2.0 | 1.5 | 1.5 |

EXAMPLE 4

Using the system of FIG. 6, and a tapered mandrel having a diameter of 3.94 inches at the larger end, polypropylene polymer was spun at 620°F at a rate of 11 pounds per hour onto the rotating mandrel. Temperature of the attenuating air was 630°F. The cylinder was drawn off the mandrel and flattened before windup. The resulting cylinders when flattened were 5.7 inches wide, and when slit and opened out were 11.5 inches wide, although the width of the die used was only 10 inches. The sheets were quite strong and very flexible, with apparent complete recovery after numerous foldings. Various tests were run on these sheets, with the results shown in Table II. These sheets have many uses as filter media, both in tubular and slit form, and in addition are useful as thermal and electrical insulation, as clothing, interliners for diposable clean room and hospital garments, as battery separators, and for other purposes.

TABLE II

| | CONTINUOUS FLEXIBLE TUBULAR POLYPROPYLENE WEBS | | | | | | | | |
|---|---|---|---|---|---|---|---|---|---|
| | Die to mandrel distance | | Polymer flow rate lbs/hr | Air pressure psi | Mandrel speed rpm | Thickness inch | Weight per sq. ft. grams | Max particle passed μm | Pressure drop at 28 fpm air in w.c.[1] |
| Run No. | Forming end | Pull Off end | | | | | | | |
| 1 | 8 | 9 | 11 | 12 | 170 | 0.015 | 4.6 | 25 | 0.2 |
| 2 | 5 | 5 | 11 | 13 | 263 | 0.020 | 6.7 | 22 | 0.4 |
| 3 | 5 | 5 | 11 | 12 | 263 | 0.024 | 8.3 | 19 | 0.65 |
| 4 | 5 | 5 | 11 | 12 | 218 | 0.040 | 11.4 | 14 | 0.9 |
| 5 | 6 | 6 | 11 | 12 | 170 | 0.045 | 14.5 | 9 | 1.15 |
| 6 | 6 | 6 | 11 | 12 | 170 | 0.058 | 18 | 8 | 1.20 |

[1]inches water column.

EXAMPLE 5

Using the system of FIG. 7, a mandrel of polypropylene is extruded with an inside diameter of 1 inch and an outside diameter of 1.30 inches and is continuously perforated as it issues from the die. Polypropylene polymer is spun at 630°F. at a rate of 11 pounds per hour onto this mandrel which is rotating at 135 rpm. The filter cylinder of polypropylene fibers is drawn off at 2¾ inches outside diameter. The composite filter cylinder on the mandrel as a core is drawn at a rate of 1¼ feet per minute, and cut into lengths of 9⅝ inches, which are then end-capped to produce the filter cartridges shown in FIGS. 8 and 9. These are useful to filter both gases and liquids.

EXAMPLE 6

Using the system of FIG. 10, a mandrel of polypropylene netting is extruded, having an open mesh rigid structure with diamond shaped openings approximately 0.12 × 0.12 inches. This netting has an inside diameter of 1 inch and an outside diameter of 1.25 inches. Polypropylene polymer is spun at 625°F. at a rate of 11 pounds per hour onto this mandrel which is rotating at 135 rpm. The filter cylinder of polypropylene fibers is 2.00 inches outside diameter. The composite filter cylinder on the mandrel as a core is drawn forward at a rate of 2½ feet per minute, and cut into lengths of 9⅝ inches, which are then end-capped to produce the filter cartridges shown in FIGS. 13 and 14. These are useful to filter both gases and liquids.

EXAMPLE 7

The system of FIG. 1 is modified by substituting for the single rotating mandrel an array of ten copper wires, arranged in a V with the spinning die projecting the fibers directly into the V towards the tip end. Each wire is rotated as it translates across the stream of effluent fibers. The rate of rotation is adjusted so that each wire is coated with by a layer of polyethylene fibers approximately 0.006 inch thick. The resulting insulated wire has an extremely low loss factor, when used to conduct high frequency electrical currents, due to the very high 90 percent voids volume of the coating, and the natural low loss factor of polyethylene.

Preferred types of spinning dies are described in (1) the report *Manufacture of Superfine Organic Fibers*, U.S. Department of Commerce, Office of Technical Services, from the Naval Research Laboratory, (2) the article by Van A. Wente, *Ind J Eng. Chem.*, Vol. 48, No. 8, pp. 1342–1346, August, 1956, and (3) the report An Improved Device for the Formation of Superfine Thermoplastic Fibers by Lawrence, Lucas & Young, U.S. Naval Research Laboratory, Feb. 11, 1959, the disclosures of which three reports are hereby incorporated by reference. One type of spinning die of these reports has been illustrated in FIGS. 2 and 3.

Having regard to the foregoing disclosure, the following is claimed as the inventive and patentable embodiments thereof:

1. A process for forming nonwoven webs of thermoplastic fibrous material in a seamless cylindrical configuration and in continuous lengths, which comprises spinning molten thermoplastic material from a multiplicity of orifices arranged at an angle to a rotating mandrel so that some orifices are at a greater distance from the mandrel than others, and some fibers travel over a greater distance than others, before they are collected on the mandrel, applying a gas blast at the orifices of the spinning die directed generally in the direction of projection of the fibers from the orifices, so as to attenuate and disrupt the fibers into discrete lengths; collecting and winding the resulting discrete lengths of fibers directly on a rotating mandrel to form thereon a generally spirally wound cylindrical layer of randomly oriented heterogeneously intertwined spun fibers of controlled density, and moving the resulting seamless spirally wound cylindrical fibrous layer in a continuous length axially on the mandrel away from the trajectory of fibers.

2. A process according to claim 1, in which the fibers after attenuation have a diameter below $10\mu$.

3. A process according to claim 1 in which the orifices and mandrel are arranged to lay down first the fibers from those orifices closest to the mandrel, so that a greater density is obtained in the portion of the layer that is closest to the mandrel.

4. A process according to claim 1 in which the orifices and mandrel are arranged to lay down first the fibers from those orifices at the greatest distance from the mandrel, so that a lesser density is obtained in the portion of the layer that is closest to the mandrel.

5. A process according to claim 1 in which the cylinder of nonwoven fibrous sheet material is drawn off the mandrel along the longitudinal axis of the mandrel.

6. A process according to claim 5 in which the cylinder is drawn off the mandrel continuously as the fibers are being spun, so that the cylinder is continuously formed at one end of the mandrel, and continuously withdrawn at the other, while the mandrel is rotating.

7. A process according to claim 1 in which the fibers are soft and adherent at the time they strike the mandrel, and become bonded together at their crossing points in due course of windup on the mandrel.

8. A process according to claim 1 in which the fibers become solidified, and are non tacky at the time they reach the mandrel and are wound up.

9. A process according to claim 1 in which the seamless cylinder that is obtained is cut into selected lengths.

10. A process according to claim 9 in which the cylinder is sufficiently rigid to retain its cylindrical shape.

11. A process according to claim 9 in which the lengths are formed into filter cartridges by applying internal and external supports and end caps.

12. A process according to claim 9 in which the lengths are formed into filter cartridges by applying internal or external supports and end caps.

13. A process according to claim 1 in which fibrous sheet material is flexible and the cylinder is flattened to form a double layer sheet with the edges held together and therefore nonravelling.

14. A process according to claim 1 in which the cylinder is slit longitudinally, and opened out to form a single-layer sheet.

15. A process according to claim 1 in which the fibers are laid down on a tubular foraminous mandrel of thermoplastic polymeric material which itself serves as a permanent core for the resulting cylinder.

16. A process according to claim 15 in which a filter element is prepared therefrom by cutting the cylinder into selected lengths and applying end caps to the ends of the lengths.

17. A process according to claim 16 in which the mandrel is also continuously extruded through a die.

18. A process according to claim 17 in which a filter element is prepared therefrom by cutting the cylinder into selected lengths and applying end caps to the ends of the lengths.

* * * * *